(12) United States Patent
Okada

(10) Patent No.: US 9,967,448 B2
(45) Date of Patent: May 8, 2018

(54) IMAGE-CAPTURING APPARATUS, ACCESSORY APPARATUS AND STORAGE MEDIUM STORING CONTROL PROGRAM

(71) Applicant: CANON KABUSHIKI KAISHA, Tokyo (JP)

(72) Inventor: Koji Okada, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 15/472,362

(22) Filed: Mar. 29, 2017

(65) Prior Publication Data

US 2017/0289433 A1    Oct. 5, 2017

(30) Foreign Application Priority Data

Mar. 31, 2016  (JP) .................................. 2016-070230

(51) Int. Cl.
  *H04N 5/232* (2006.01)
  *G03B 17/56* (2006.01)
  *H04N 5/225* (2006.01)

(52) U.S. Cl.
  CPC ......... *H04N 5/23209* (2013.01); *G03B 17/56* (2013.01); *H04N 5/2251* (2013.01)

(58) Field of Classification Search
  CPC ... G03B 17/56; H04N 5/2251; H04N 5/23209
  See application file for complete search history.

(56) References Cited

U.S. PATENT DOCUMENTS

| 5,781,818 | A | 7/1998 | Kobayashi | |
|---|---|---|---|---|
| 9,077,889 | B2 * | 7/2015 | Hayashi | H04L 41/042 |
| 2011/0292236 | A1 * | 12/2011 | Shiohara | G06T 1/00 348/222.1 |
| 2013/0141609 | A1 * | 6/2013 | Watazawa | G03B 17/14 348/222.1 |
| 2014/0333743 | A1 * | 11/2014 | Gilreath | A61B 1/00009 348/74 |
| 2015/0042816 | A1 * | 2/2015 | Karels | H04N 9/045 348/164 |
| 2016/0035096 | A1 * | 2/2016 | Rudow | G01S 19/25 348/135 |

FOREIGN PATENT DOCUMENTS

JP    3658084 B2    6/2005

* cited by examiner

*Primary Examiner* — Amy Hsu
(74) *Attorney, Agent, or Firm* — Rossi, Kimms & McDowell LLP

(57) ABSTRACT

The image-capturing apparatus includes a camera communicator to providing, with the accessory apparatus, three channels that are a notification channel, a first data communication channel used for transmitting accessory data from the accessory apparatus to the image-capturing apparatus, and a second data communication channel used for transmitting camera data from the image-capturing apparatus to the accessory apparatus. A camera controller is configured to, in response to detecting a start bit included in each of frames of the accessory data and indicating a start of each frame, transmit one frame of the camera data to the accessory apparatus through the second data communication channel and perform detection of the start bit regardless of whether or not during transmitting the camera data to the accessory apparatus.

10 Claims, 9 Drawing Sheets

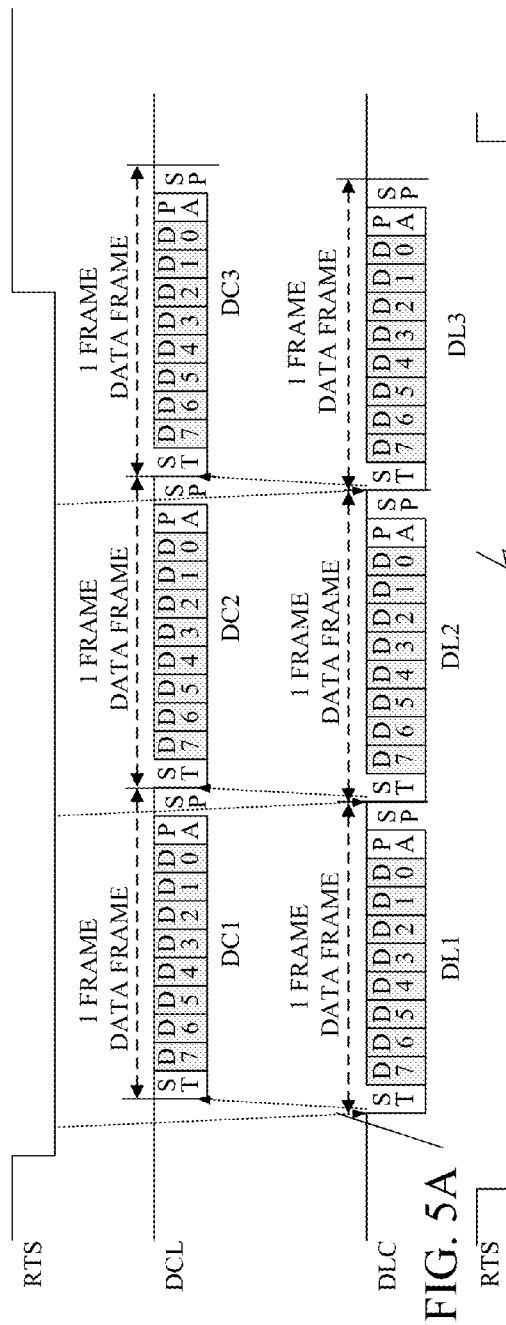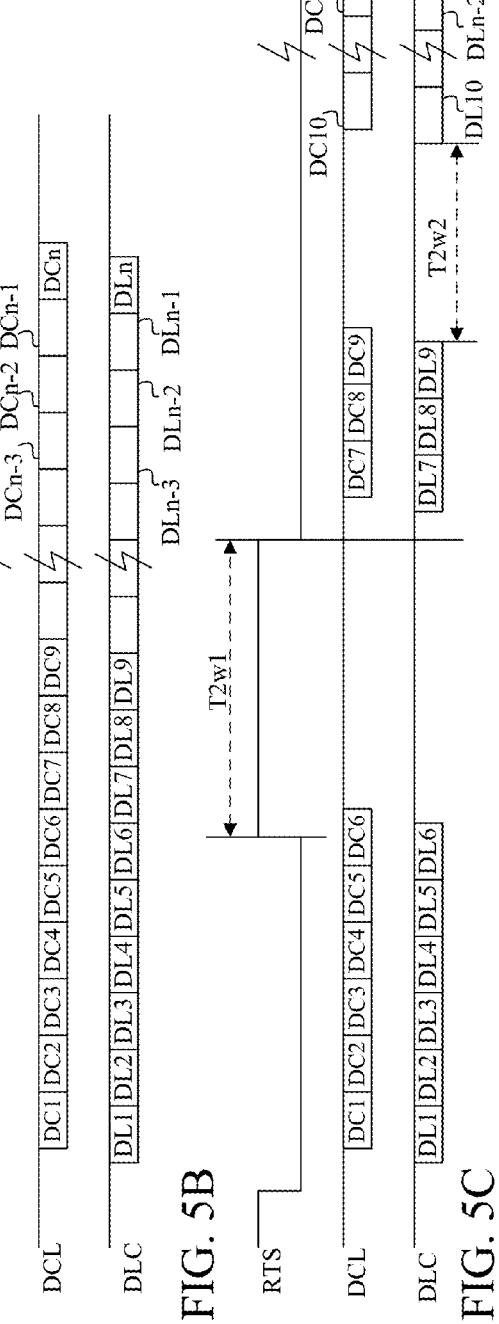
FIG. 5A
FIG. 5B
FIG. 5C

IMAGE-CAPTURING APPARATUS, ACCESSORY APPARATUS AND STORAGE MEDIUM STORING CONTROL PROGRAM

BACKGROUND OF THE INVENTION

Field of the Invention

The present invention relates to an image-capturing apparatus (hereinafter referred to as "a camera body") and an accessory apparatus such as an interchangeable lens, which are communicable with each other.

Description of the Related Art

In an accessory-interchangeable camera system including a camera body to which an accessory apparatus is detachably attachable, the camera body and the accessory apparatus communicate with each other for controlling the accessory apparatus from the camera body and for providing, from the accessory apparatus to the camera body, data required for controlling the accessory apparatus. In particular, when an interchangeable lens is used for capturing a moving image to be recorded or a live-view moving image to be displayed, smooth lens control in synchronization with image-capturing periods is required, so that it is necessary to synchronize image-capturing times in the camera body with control times in the interchangeable lens. Thus, the camera body is required to complete receipt of the data from the interchangeable lens and transmission of various commands and requests to the interchangeable lens in one image-capturing period.

However, an increase in amount of the data to be received by the camera body from the interchangeable lens and a reduction of the image-capturing period (that is, an increase in a frame rate) require a large data volume communication in a shorter time. Japanese Patent No. 3658084 discloses a clock-synchronous communication system using three channels that are a clock channel, a data transmission channel for data transmission from a camera body to an interchangeable lens and another data transmission channel for data transmission from the interchangeable lens to the camera body. In this communication system, the camera body as a communication master first generates a clock signal to output (transmit) the clock signal for one frame (8 bits) to the interchangeable lens through the clock channel. Then, the clock channel switches its input and output direction and the interchangeable lens as a communication master changing from the camera body outputs a BUSY signal to the camera body through the clock channel. The output of the BUSY signal enables the interchangeable lens to notify the camera body of a communication wait (non-communicable) state.

However, the communication system disclosed in Japanese Patent No. 3658084 requires time-managed switching of the communication master between the camera body that outputs the clock signal and the interchangeable lens that outputs the BUSY signal. Therefore, the communication system requires a non-communicable time period for switching the communication master, that is, in which the communication is prohibited, which results in delay in communication and control. Although this communication system employs a CMOS communication system to increase its clock speed, as the clock speed increases the above-described delay more significantly decreases throughput of the communication system.

Causing the interchangeable lens to stop outputting the BUSY signal to the clock channel in order to solve such a problem prevents the interchangeable lens from transmitting a communication suspension (standby) request to the camera body. Furthermore, transmitting a large amount of data without using the BUSY signal may result in failed communication when, in the interchangeable lens as a communication slave, a receiving buffer has an insufficient capacity relative to the transmitted data or data to be transmitted to the camera body is not produced in time. Moreover, providing a new channel for the BUSY signal increases power consumption of the communication system and increases sizes of the camera body and interchangeable lens.

SUMMARY OF THE INVENTION

The present invention provides an image-capturing apparatus and an interchangeable lens each capable of communicating a large amount of data at a high speed without proving a new channel.

The present invention provides as an aspect thereof an image-capturing apparatus to which an accessory apparatus is detachably attachable. The image-capturing apparatus includes a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and a camera controller configured to control data communication with the accessory apparatus through the camera communicator. The camera controller is configured to, in response to detecting a start bit included in each of frames of the accessory data and indicating a start of each frame, transmit one frame of the camera data to the accessory apparatus through the second data communication channel, and to perform detection of the start bit regardless of whether or not during transmitting the camera data to the accessory apparatus.

The present invention provides as yet another aspect thereof an image-capturing system including the above image-capturing apparatus and the accessory apparatus.

The present invention provides as still another aspect thereof an accessory apparatus detachably attachable to an image-capturing apparatus, the accessory apparatus. The accessory apparatus includes an accessory communicator configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and an accessory controller configured to control data communication with the image-capturing apparatus through the accessory communicator. The accessory controller is configured to transmit, to the image-capturing apparatus, the accessory data whose data length of one frame is longer than that of one frame of the camera data.

The present invention provides as further another aspect thereof an image-capturing apparatus to which an accessory apparatus is detachably attachable. The image-capturing apparatus includes a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and a camera controller configured to control data communication with the accessory apparatus through the camera communicator. The camera controller is configured to receive, from the accessory apparatus, the accessory data whose data length of one frame is longer than that of one frame of the camera data.

The present invention provides as still further another aspect thereof a non-transitory storage medium storing a control program as a computer program for causing a computer to perform the above-described process in the image-capturing apparatus or the accessory apparatus.

Further features and aspects of the present invention will become apparent from the following description of exemplary embodiments with reference to the attached drawings.

BRIEF DESCRIPTION OF THE DRAWINGS

FIGS. 5A to 5C illustrate signal waveforms in a communication mode M3 in Embodiment 1.

DESCRIPTION OF THE EMBODIMENTS

Exemplary embodiments of the present invention will be described below with reference to the accompanied drawings. Each embodiment will describe a communication process (communication control) between a camera body as an image-capturing apparatus and an interchangeable lens as an accessory apparatus. First, description will be made of definitions of terms in the embodiments.

"A communication format" is an arrangement for data communication between the camera body and the interchangeable lens. "A communication method" indicates a clock-synchronous method and an asynchronous method. The clock-synchronous method is hereinafter referred to as "a communication method A", and the asynchronous method is hereinafter referred to as "a communication method B". "A data format" of a data signal indicates whether or not a BUSY signal (described later) is allowed to be added to the data signal. A data format allowing the addition of the BUSY signal is hereinafter referred to as "a format F1", and a data format not allowing (prohibiting) the addition of the BUSY signal is hereinafter referred to as "a format F2".

"A communication mode" is a combination of the communication method and the data format. Each embodiment will describe the following "The communication mode M1" is a conventional communication mode that is a combination of the communication method A and the format F1, and "the communication mode M2" is a new communication mode that is a combination of the communication method B and the format F1. Furthermore, "the communication mode M3" is a DLC1*ch* burst communication mode as another new communication mode that is a combination of the communication method B and the format F2.

Embodiment 1

Figure 1:
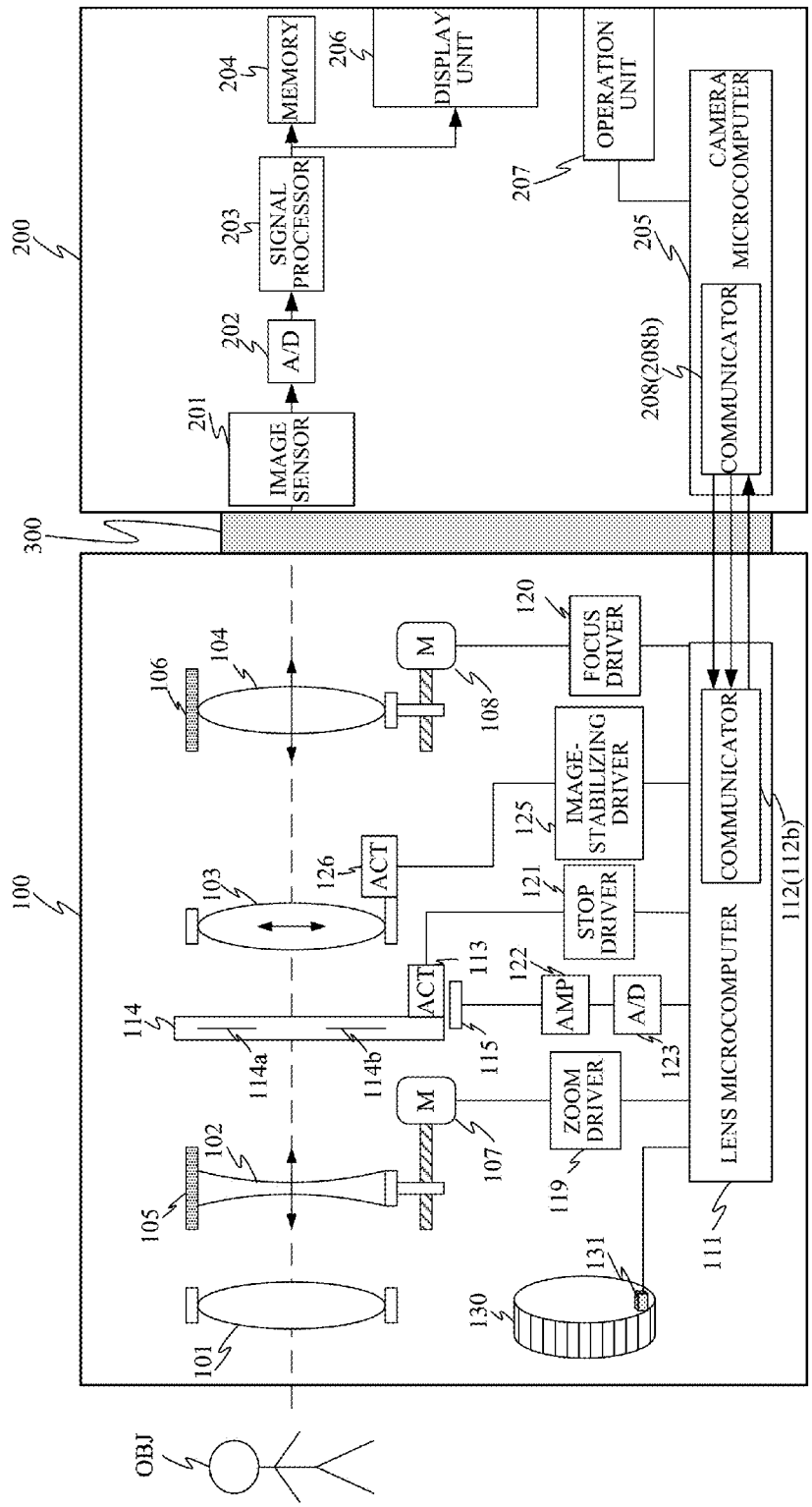
FIG. 1 is a block diagram illustrating a lens-interchangeable camera system that is Embodiment 1 of the present invention.

FIG. 1 illustrates a configuration of an image-capturing system (hereinafter referred to as "a camera system") including the camera body 200 and the interchangeable lens 100, which is a first embodiment (Embodiment 1) of the present invention.

The camera body 200 and the interchangeable lens 100 transmit control commands and internal information to each other via their communicators described later.

The communicators are compatible with various communication methods and switch their communication formats to the same one in synchronization with each other depending on types of data to be communicated and purposes of their communication, which enables selecting an optimum communication method for each of various situations.

First, description will be made of specific configurations of the interchangeable lens 100 and the camera body 200. The interchangeable lens 100 and the camera body 200 are mechanically and electrically connected with each other via a mount 300 including a coupling mechanism. The interchangeable lens 100 receives power supply from the camera body 200 via a power source terminal (not illustrated) provided in the mount 300 and supplies, to various actuators and a lens microcomputer 111 described later, power sources necessary for their operations. The interchangeable lens 100 and the camera body 200 communicate with each other via communication terminals (illustrated in FIG. 2) provided in the mount 300.

The interchangeable lens 100 includes an image-capturing optical system. The image-capturing optical system includes, from an object (OBJ) side, a field lens 101, a magnification-varying lens 102 for variation of magnification, a stop unit 114 for light amount control, an image-stabilizing lens 103 for image blur correction and a focus lens 104 for focusing.

The magnification-varying lens 102 and the focus lens 104 are respectively held by lens holders 105 and 106. The lens holders 105 and 106 are guided by guide bars (not illustrated) movably in an optical axis direction in which an optical axis (illustrated by a broken line) of the image-capturing optical system extends and are driven in the optical axis direction respectively by stepping motors 107 and 108. The stepping motors 107 and 108 rotate in synchronization with drive pulses and respectively move the magnification-varying lens 102 and the focus lens 104.

The image-stabilizing lens 103 is moved in a direction orthogonal to the optical axis of the image-capturing optical system to reduce image blur caused by user's hand jiggling or the like.

The lens microcomputer 111 as an accessory controller controls various operations in the interchangeable lens 100.

The lens microcomputer 111 receives, via a lens communicator 112 (including a lens data transceiver 112b) as an accessory communicator, control commands transmitted from the camera body 200 and transmission requests for lens data (accessory data) output therefrom. The lens microcomputer 111 performs various lens controls corresponding to the control commands and transmits, to the camera body 200, lens data corresponding to the transmission requests via the lens communicator 112. The lens microcomputer 111 performs operations relating to the communication with the camera body 200 (that is, with a camera microcomputer 205 described later) according to a lens communication control program as a computer program.

In addition, the lens microcomputer 111 outputs, in response to a zoom command and a focus drive command among the control commands, a zoom drive signal and a focus drive signal to a zoom driver 119 and a focus driver 120 to cause them to drive the stepping motors 107 and 108, thereby performing a zoom process to control a magnification variation operation by the magnification-varying lens 102 and an AF (autofocus) process to control a focus operation by the focus lens 104.

The interchangeable lens 100 is provided with a manual focus ring 130 that is rotationally operable by a user and a focus encoder 131 for detecting a rotational operation amount of the manual focus ring 130. The lens microcomputer 111 causes the focus driver 120 to drive the stepping motor 108 by a drive amount corresponding to the rotational operation amount of the manual focus ring 130 detected by the focus encoder 131 to drive the focus lens 104, thereby performing MF (manual focus).

The stop unit 114 includes stop blades 114a and 114b. An open-and-close state of the stop blades 114a and 114b is detected by a hall element 115, and a detection result thereof is input to the lens microcomputer 111 through an amplifier 122 and an A/D converter 123. The lens microcomputer 111 outputs, depending on the input detection result from the A/D converter 123, a stop drive signal to a stop driver 121 so as to cause the stop driver 121 to drive a stop actuator 113, thereby controlling a light amount control operation of the stop unit 114.

The interchangeable lens 100 further includes a shake sensor (not illustrated and hereinafter referred to as "a gyro sensor") constituted by a vibration gyro or the like. The lens microcomputer 111 drives an image-stabilizing actuator 126 constituted by a voice coil motor or the like through an image-stabilizing driver 125 depending on a shake (angular velocity) detected by the gyro sensor, thereby performing an image-stabilizing process to control the movement of the image-stabilizing lens 103.

The camera body 200 includes an image sensor 201 constituted by a CCD sensor, a CMOS sensor or the like, an A/D converter 202, a signal processor 203, a recorder 204, the camera microcomputer 205 and a display unit 206.

The image sensor 201 photoelectrically converts an object image formed by the image-capturing optical system in the interchangeable lens 100 to output an image-capturing signal as an analog electrical signal.

The A/D converter 202 converts the analog image-capturing signal from the image sensor 201 into a digital image-capturing signal. The signal processor 203 performs various image processes on the digital image-capturing signal from the A/D converter 202 to produce a video signal. The signal processor 203 produces, from the video signal, focus information indicating a contrast state of the object image (that is, a focus state of the image-capturing optical system) and luminance information indicating an exposure state. The signal processor 203 outputs the video signal to the display unit 206. The display unit 206 displays the video signal as a live-view image used for checking an image-capturing composition and the focus state.

In addition, the signal processor 203 outputs the video signal to the recorder 204. The recorder 204 records the video signal.

The camera microcomputer 205 as a camera controller controls the camera body 200 in response to inputs from a camera operation unit 207 including an image-capturing instructing switch and various setting switches (not illustrated). The camera microcomputer 205 transmits, in response to a user's operation of a zoom switch (not illustrated), the control command relating to the magnification-varying operation of the magnification-varying lens 102 to the lens microcomputer 111 through a camera communicator 208 (including a camera data transceiver 208b). Moreover, the camera microcomputer 205 transmits, to the lens microcomputer 111 through the camera communicator 208, the control command relating to the light amount control operation of the stop unit 114 depending on the luminance information and the control command relating to the focusing operation of the focus lens 104 depending on the focus information. The camera microcomputer 205 performs operations relating to the communication with the lens microcomputer 111 according to a camera communication control program as a computer program.

Figure 2:
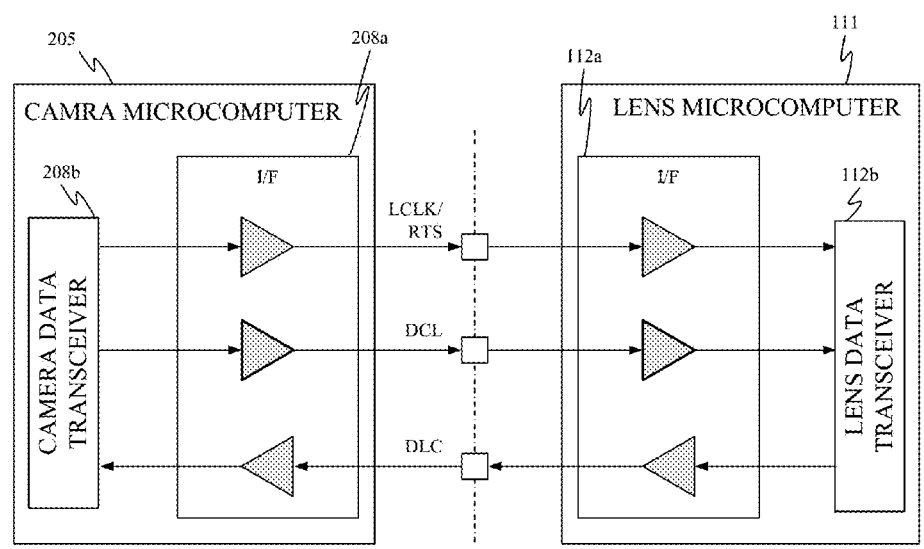
FIG. 2 illustrates a communication circuit between a camera body (camera microcomputer) and an interchangeable lens (lens microcomputer) in a first communication setting in Embodiment 1.

Next, with reference to FIG. 2, description will be made of a communication circuit constituted between the camera body 200 (camera microcomputer 205) and the interchangeable lens 100 (lens microcomputer 111) and of the communication performed therebetween. The camera microcomputer 205 has a function of managing settings for the communication with the lens microcomputer 111 and a function of providing notices such as the transmission requests. On the other hand, the lens microcomputer 111 has a function of producing lens data and a function of transmitting the lens data.

The camera microcomputer 205 includes a camera communication interface circuit 208a, and the lens microcomputer 111 includes a lens communication interface circuit 112a.

The camera microcomputer 205 (camera data transceiver 208b) and the lens microcomputer 111 (lens data transceiver 112b) communicate with each other through the communication terminals (illustrated by three boxes) provided in the mount 300 and the camera and lens communication interface circuits 208a and 112a.

In this embodiment, the camera and lens microcomputers 205 and 111 perform three-wire asynchronous serial communication using three channels. The camera data transceiver 208b and the camera communication interface circuit 208a constitute the camera communicator 208. The lens data transceiver 112b and the lens communication interface circuit 112a constitute the lens communicator 112.

One of the three channels is a clock channel in the communication method A and is a transmission request channel as a notification channel in the communication method B. One of the remaining two channels is a first data communication channel used for transmitting the lens data from the lens microcomputer 111 to the camera microcomputer 205. The other one of the remaining two channels is a second data communication channel used for transmitting camera data from the camera microcomputer 205 to the lens microcomputer 111. The lens data transmitted as a signal from the lens microcomputer 111 to the camera microcomputer 205 through the first data communication channel is hereinafter referred to as "a lens data signal DLC". The camera data transmitted as a signal from the camera microcomputer 205 to the lens microcomputer 111 through the second data communication channel is hereinafter referred to as "a camera data signal DCL".

Description will be made of data communication in the communication method A. In the communication method A, the camera microcomputer 205 as a communication master outputs a clock signal LCLK to the lens microcomputer 111 as a communication slave through the clock channel. The camera data signal DCL includes various control commands and transmission request commands transmitted from the camera microcomputer 205 to the lens microcomputer 111. On the other hand, the lens data signal DLC includes various data transmitted in synchronization with the clock signal LCLK from the lens microcomputer 111 to the camera microcomputer 205. The camera and lens microcomputers 205 and 111 communicate with each other in synchronization with the common clock signal LCLK by a full-duplex communication method enabling mutual and simultaneous data transmission and receipt.

Figure 3A:
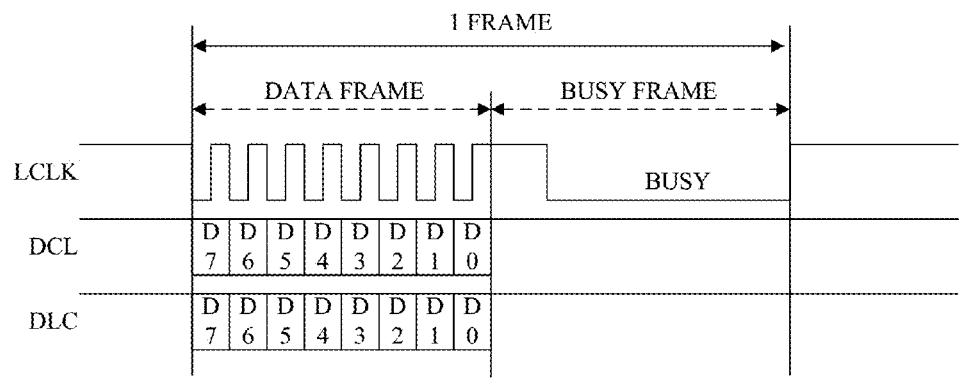
FIGS. 3A to 3C illustrate signal waveforms in a communication mode M1 in Embodiment 1.
Figure 3B:
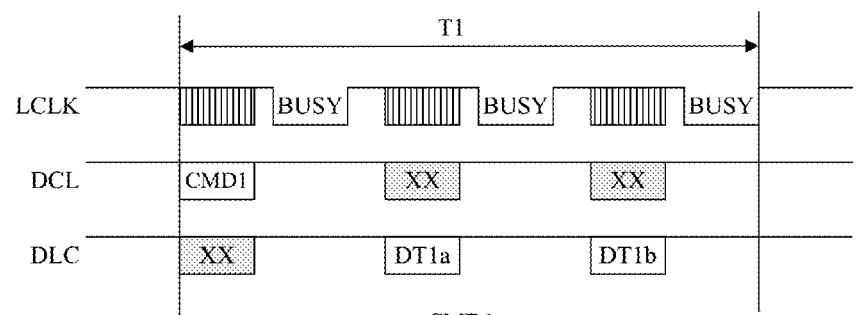
Figure 3C:
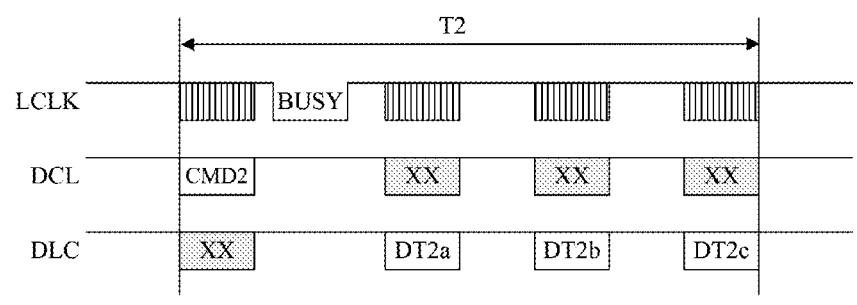

FIGS. 3A to 3C illustrates waveforms of signals transmitted and received between the camera and lens microcomputers 205 and 111 in the communication method A. An arrangement of procedures of the signal transmission and receipt is called a communication protocol.

FIG. 3A illustrates signal waveforms of one frame as a minimum communication unit. The camera microcomputer 205 first outputs the clock signal LCLK including a group of 8-period clock pulses and transmits the camera data signal DCL in synchronization with the clock signal LCLK to the lens microcomputer 111. Simultaneously therewith, the camera microcomputer 205 receives the lens data signal DLC transmitted in synchronization with the clock signal LCLK from the lens microcomputer 111. In this way, data of 1 byte (8 bits) is transmitted and received in synchronization with the clock signal LCLK (8-period clock pulses) between the camera and lens microcomputers 205 and 111. A time period in which the byte data is transmitted and received is called a data frame.

After the transmission and receipt of the data frame, the lens microcomputer 111 transmits, to the camera microcomputer 205, a signal for notifying the camera microcomputer 205 of a communication standby request BUSY (the signal is hereinafter referred to as "a BUSY signal"), and thereby a communication suspension time period is inserted. This communication suspension time period is called a BUSY frame. The data frame and the BUSY frame form one frame as a communication unit. The BUSY frame is not necessarily added to the data frame depending on a communication situation, and in this case the data frame alone forms one frame.

FIG. 3B illustrates signal waveforms of continuous three frames when the camera microcomputer 205 transmits a transmission request command CMD1 to the lens microcomputer 111 and receives lens data DT1 (DT1*a* and DT1*b*) of 2 bytes corresponding to the transmission request command CMD1 from the lens microcomputer 111.

The camera and lens microcomputers 205 and 111 set beforehand therebetween multiple lens data DT and numbers of bytes thereof corresponding to multiple transmission request commands CMD (for example, CMD1 and CMD2). The camera microcomputer 205 as the communication master (clock master) transmits one (CMD1 in FIG. 3B) of the transmission request commands CMD to the lens microcomputer 111. In response thereto, the lens microcomputer 111 transmits, to the camera microcomputer 205, a necessary clock number based on information on the number of bytes of the lens data DT corresponding to the received transmission request commands CMD.

In FIG. 3B, the camera microcomputer 205 transmits the clock signal LCLK to the lens microcomputer 111 and further transmits, as the camera data signal DCL, the transmission request command CMD1 for requesting transmission of the lens data DT1 to the lens microcomputer 111. The lens data DT1 in this frame is treated by the lens microcomputer 11 as invalid data.

The lens microcomputer 111 performs, in response to receiving the transmission request command CMD1, a process including addition of the BUSY signal to the clock signal LCLK, and thereby the above-described BUSY frame is inserted between the frames.

Next, the camera microcomputer 205 outputs one frame of the clock signal LCLK (8-period clock pulses) to the lens microcomputer 111 through the clock channel, and then switches a camera microcomputer (camera body) side setting of the clock channel from a previous output setting to an input setting. Upon completion of the switching of the clock channel setting in the camera microcomputer 205, the lens microcomputer 111 switches a lens microcomputer (interchangeable) side setting of the clock channel from a previous input setting to an output setting. Then, the lens microcomputer 111 changes, in order to notify the camera microcomputer 205 of the communication standby request BUSY, a signal level (voltage level) on the clock channel from High to Low. The lens microcomputer 111 thereby outputs the BUSY signal to the clock channel. The camera microcomputer 205 maintains the input setting of the clock channel during receiving the communication standby request BUSY and suspends the communication with the lens microcomputer 111.

The lens microcomputer 111 produces the lens data DT1 corresponding to the transmission request command CMD1 during transmitting the communication standby request BUSY. Then, upon completion of a preparation for transmitting the lens data DT1 as a subsequent lens data signal DLC, the lens microcomputer 111 switches the signal level on the clock channel from Low to High to terminate the communication standby request BUSY. The camera microcomputer 205 recognizes the termination of the communication standby request BUSY and then transmits one frame of the clock signal LCLK to the lens microcomputer 111 to receive the lens data DT1*a* from the lens microcomputer 111. Thereafter, in a subsequent frame, the camera microcomputer 205 outputting one frame of the clock signal LCLK (8-period clock pulses) and the lens microcomputer 111 repeat the above-described processes, and thereby the camera microcomputer 205 receives the lens data DT1*b* from the lens microcomputer 111.

FIG. 3C illustrates signal waveforms of continuous four frames when the camera microcomputer 205 transmits a transmission request command CMD2 to the lens microcomputer 111 and receives lens data DT1 (DT2*a*, DT2*b* and DT2*c*) of 3 bytes corresponding to the transmission request command CMD2 from the lens microcomputer 111. The lens microcomputer 111 performs, in response to receiving the transmission request command CMD2, a process including addition of the BUSY signal to the clock signal LCLK only in a first frame. In other word, the lens microcomputer 111 does not output the BUSY signal in subsequent second to fourth frames. Thereby, the BUSY frame is not inserted between the second to fourth frames, which enables shortening an interval time between these frames. However, in a time period in which no BUSY frame is inserted, the lens microcomputer 111 cannot transmit the communication standby request BUSY to the camera microcomputer 205. Therefore, in order to prevent occurrence of failed communication due to no insertion of the BUSY frame, it is necessary to set beforehand a data amount (frame number) to be transmitted, a transmission interval, a communication priority order in the lens microcomputer 111 and others.

Next, description will be made of data communication in the communication method B and the communication mode M2 using the communication method B with the format F1.

Figure 4:
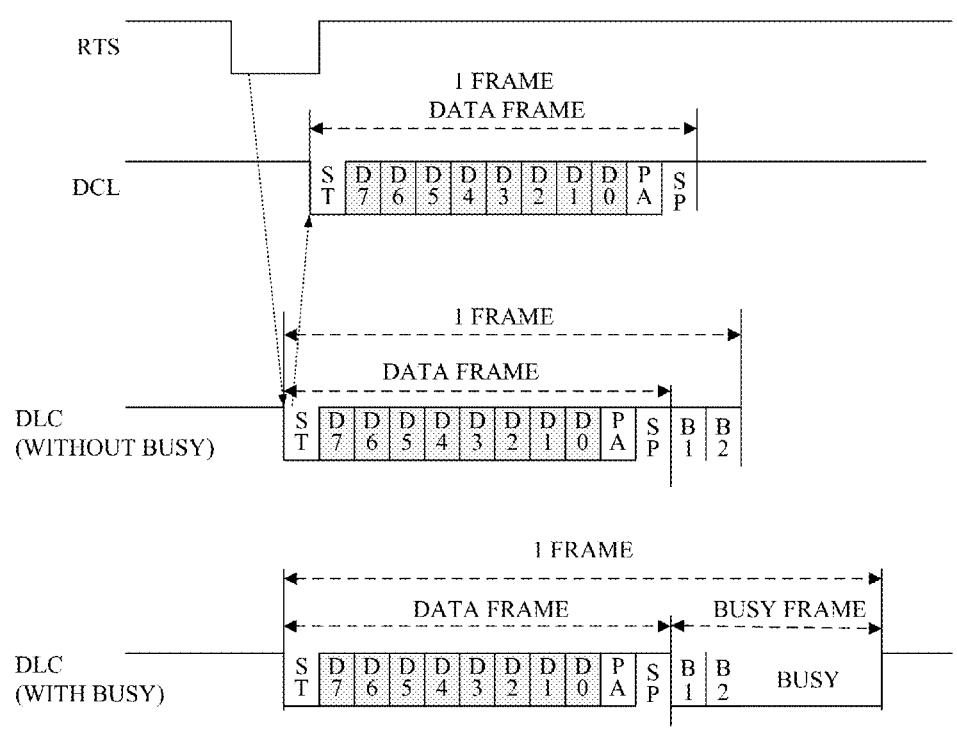
FIG. 4 illustrates signal waveforms in a communication mode M2 in Embodiment 1.

FIG. 4 illustrates waveforms of signals transmitted and received in the communication mode M2 (communication method B) between the camera and lens microcomputers 205 and 111. As described above, the format F1 allows adding the BUSY frame to the lens data signal DLC.

In the communication method B, the transmission request channel (RTS) is used for providing, from the camera microcomputer 205 as the communication master to the lens microcomputer 111 as the communication slave, a transmission request (transmission instruction) and others as notices for requesting the lens microcomputer 111 to transmit the lens data signal DLC to the camera microcomputer 205. The provision of the notice through the transmission request channel is performed by switching a signal level (voltage level) on the transmission request channel between High as a first level and Low as a second level. A transmission request signal provided to the transmission request channel is hereinafter referred to as "a request-to-send signal RTS".

The first data communication channel is used, as in the communication method A, for transmitting the lens data signal DLC including various data from the lens microcomputer 111 to the camera microcomputer 205.

The second data communication channel is also used, as in the communication method A, for transmitting the camera data signal DCL including various control commands and transmission request commands from the camera microcomputer 205 to the lens microcomputer 111.

In the communication method B, in contrast to the communication method A, the camera and lens microcomputers 205 and 111 do not transmit and receive the data in synchronization with the common clock signal, but set their communication speed beforehand and transmit and receive the data at a communication bit rate according to this setting. The communication bit rate indicates a data amount transferable per second and is expressed with a unit of bps (bits per second). The camera and lens microcomputers 205 and 111 communicate with each other, as in the communication method A, by the full-duplex communication method enabling mutual data transmission and receipt.

FIG. 4 illustrates signal waveforms of one frame as a minimum communication unit. The camera data signal DCL and the lens data signal DLC have mutually different parts in their data formats in the one frame.

First, description will be made of the data format of the lens data signal DLC. The lens data signal DLC in the one frame includes, as large parts, a data frame as a first frame and a BUSY frame as a subsequent frame. A signal level of the lens data signal DLC is held at High in a non-transmission state where data transmission is not performed.

The lens microcomputer 111 sets the signal level to Low in one bit time period in order to provide a notice of a start of one frame transmission of the lens data signal DLC to the camera microcomputer 205.

The one bit time period indicating a start of one frame is called "a start bit ST" in this embodiment. That is, one data frame is started from this start bit ST. The start bit ST is provided as a head bit of each one frame of the lens data signal DLC.

Next, the lens microcomputer 111 transmits one-byte lens data in 8 bit time period from a subsequent second bit to a ninth bit. The data bits are arranged in an MSB-first format starting from a highest-order data bit D7 and continuing to data bits D6, D5, D4, D3, D2 and D1 in this order and ending with a lowest-order data bit D0. Then, the lens microcomputer 111 adds one bit parity information (parity bit) PA at a tenth bit and sets the signal level of the lens data signal DLC to High in a time period of a stop bit SP indicating an end of the one frame. Thus, the data frame starting from the start bit SP ends.

Thereafter, as illustrated by "DLC (with BUSY)" in FIG. 4, the lens microcomputer 111 adds a BUSY frame after the stop bit SP. The BUSY frame indicates, and in the communication method A, a time period of the communication standby request BUSY as a notice (hereinafter referred to as "a BUSY notice") from the lens microcomputer 111 to the camera microcomputer 205.

The lens microcomputer 111 holds the signal level of the lens data signal DLC to Low until terminating the BUSY notice.

On the other hand, for a case where the BUSY notice is unnecessary to be provided from the lens microcomputer 111 to the camera microcomputer 205, as illustrated by "DLC (without BUSY)" in FIG. 4, a data format is provided that forms one frame without adding the BUSY notice (BUSY frame). That is, the lens microcomputer 111 can select as the data format of the lens data signal DLC, depending on a process situation, one to which the BUSY notice is added and one to which the BUSY notice is not added. Description will be made of a method of determining the presence and absence of the BUSY notice; the method is performed by the camera microcomputer 205. In FIG. 4, the signal waveform of "DLC (without BUSY)" and the signal waveform of "DLC (with BUSY)" both include bit positions B1 and B2. The camera microcomputer 205 selects one of these bit positions B1 and B2 as a BUSY determination position P for determining the presence and absence of the BUSY notice.

As just described, this embodiment employs a data format that selects the BUSY determination position P from the bit positions B1 and B2. This data format enables addressing a problem that a process time from the transmission of the data frame of the lens data signal DLC until the determination of the presence of the BUSY notice (the lens data signal DLC is set to Low) is changed depending on a processing performance of the lens microcomputer 111. Whether to select the bit position B1 or B2 as the BUSY determination position P is set by the communication between the camera and lens microcomputers 205 and 111 before the data communication therebetween by the communication method B is performed. The BUSY determination position P is not necessary to be fixed at the bit position B1 or B2 and may be changed depending on processing capabilities of the camera and lens microcomputers 205 and 111.

Description will be made of a reason for employing in the communication method B the data format adding the BUSY frame to the lens data signal DLC in contrast to the communication method B adding the BUSY frame to the clock signal LCLK.

In the communication method A, it is necessary for the camera and lens microcomputers 205 and 111 to transmit and receive the clock signal LCLK output from the camera microcomputer 205 as the communication master and the BUSY signal output from the lens microcomputer 111 as the communication slave. Therefore, collision between the outputs from the camera and lens microcomputers 205 and 111 is prevented by allotting time-shared output allowable time periods to the camera and lens microcomputers 205 and 111. However, in this time sharing, it is necessary to securely prevent the collision between the outputs from the camera and lens microcomputers 205 and 111. Accordingly, in a time period from a time at which the camera microcomputer 205 completes the output of the 8 pulses of the clock signal LCLK until the lens microcomputer 111 is allowed to output the BUSY signal, an output prohibited time period in which the outputs from the camera and lens microcomputers 205 and 111 are prohibited is inserted. This output prohibited time period is a communication invalid time period in which the camera and lens microcomputers 205 and 111 cannot communicate with each other, which decreases an effective communication speed.

TO solve such a problem, the communication method B employs the data format adding the BUSY frame output from the lens microcomputer 111 to the lens data signal DLC in a dedicated output channel for the lens microcomputer 111.

Next, description will be made of a data format of the camera data signal DCL. Specifications of the data format of the camera data signal DCL in one frame are common to those of the lens data signal DLC. However, the addition of the BUSY frame to the camera data signal DCL is prohibited, which is different from the lens data signal DLC.

Next, communication procedures between the camera and lens microcomputers 205 and 111 in the communication method B will be described.

First, the camera microcomputer 205 sets, when an event for starting the communication with the lens microcomputer 111 is generated, a signal level of the request-to-send signal RTS to Low (in other words, asserts the request-to-send signal RTS) to provide the transmission request to the lens microcomputer 111. The lens microcomputer 111 having detected the transmission request through the assertion (Low) of the request-to-send signal RTS performs a process to produce the lens dada signal DLC to be transmitted to the camera microcomputer 205. Then, after a preparation for transmitting the lens data signal DLC is completed, the lens microcomputer 111 starts transmitting one frame of the lens data signal DLC through the first data communication channel.

The lens microcomputer 111 starts the transmission of the lens data signal DLC within a time period mutually set by the camera and lens microcomputers 205 and 111 after the assertion of the request-to-send signal RTS. That is, in the communication method B, for the lens microcomputer 111, a strict restriction provided in the communication method A is not provided that it is necessary to set the lens data to be transmitted before a first clock pulse is input thereto in a time period from the assertion of the request-to-send signal RTS to a start of the transmission of the lens data signal DLC.

Next, in response to detecting the start bit ST as a head bit of the data frame of the lens data signal DLC received from the lens microcomputer 111 (that is, in response to a start of receiving the lens data signal DLC), the camera microcomputer 205 returns the signal level of the request-to-send signal RTS to High, in other words, negates the request-to-send signal RTS.

The camera microcomputer 205 thereby terminates the transmission request and starts the transmission of the camera data signal DCL through the second data communication channel. The negation of the request-to-send signal RTS may be performed any one of before and after the start of the transmission of the camera data signal DCL. It is only necessary that these negation and transmission be performed until the receipt of the data frame of the lens data signal DLC is completed.

The lens microcomputer 111 having transmitted the data frame of the lens data signal DLC adds the BUSY frame to the lens data signal DLC in a case where the BUSY notice is necessary to be provided to the camera microcomputer 205. The camera microcomputer 205 monitors the presence and absence of the BUSY notice and prohibits the assertion of the request-to-send signal RTS for a subsequent transmission request while the BUSY notice is provided. The lens microcomputer 111 executes necessary processes in a time period where the communication from the camera microcomputer 205 is prohibited by the BUSY notice and terminates the BUSY notice after a subsequent communication preparation is completed. The assertion of the request-to-send signal RTS by the camera microcomputer 205 for the subsequent transmission request is permitted under a condition that the BUSY notice is terminated and the transmission of the data frame of the camera data signal DCL is completed.

As just described, in this embodiment, in response to the assertion of the request-to-send signal RTS upon the generation of the communication starting event in the camera microcomputer 205, the lens microcomputer 111 starts transmitting the data frame of the lens data signal DLC to the camera microcomputer 205. On the other hand, the camera microcomputer 205 starts, in response to detecting the start bit ST of the lens data signal DLC, transmitting the data frame of the camera data signal DCL to the lens microcomputer 111. The lens microcomputer 111 adds, as needed, the BUSY frame to the data frame of the lens data signal DLC for providing the BUSY notice and then terminates the BUSY notice to end one frame communication process. In this communication process, the camera microcomputer 205 and the lens microcomputer 111 mutually transmit and receive one byte data.

Next, description will be made of the communication mode M3 in which the communication is performed using the communication method B with the format F2. FIG. 5A illustrates waveforms of signals transmitted and received in the communication mode M3 between the camera and lens microcomputers 205 and 111.

FIG. 5A illustrates waveforms of the communicated signals in continuous three frames. As described above, the format F2 prohibits adding the BUSY frame to the lens data signal DLC. Therefore, in the communication mode M3, the format F2 of the lens data signal DLC includes one frame formed only by the data frame and does not include the BUSY frame. Accordingly, in the communication mode M3, the lens microcomputer 111 cannot provide the BUSY notice to the camera microcomputer 205. This format F2 is used for burst communication as continuous communication in which each interval between frames is shortened so as to transmit relatively large volume data between the camera microcomputer 205 and the lens microcomputer 111. That is, the format F2 enables large volume data communication at a higher speed.

Next, description will be made of a communication control process performed between the camera and lens microcomputers 205 and 111 in this embodiment. FIG. 5B illustrates signal waveforms when the camera and lens microcomputers 205 and 111 continuously transmit and receive n frames of the camera data signal DCL and n frames of the lens data signal DLC (that is, when performing the burst communication). First, the camera microcomputer 205 asserts the request-to-send signal RTS when an event for starting the communication with the lens microcomputer 11 is generated. Thereafter, in the format F2 in which it is unnecessary to negate the request-to-send signal RTS at each frame in contrast to in the format F1, the camera microcomputer 205 maintains the assertion of the request-to-send signal RTS while performing continuous data communication (transmission and receipt) with the lens microcomputer 111.

The lens microcomputer 111 performs, in response to detecting a transmission request by the assertion of the request-to-send signal RTS, a process for producing the lens data signal DLC to be transmitted to the camera microcomputer 205. Then, after a preparation for transmitting the lens data signal DLC is completed, the lens microcomputer 111 starts transmitting a first frame DL1 of the lens data signal DLC to the camera microcomputer 205 through the first data communication channel.

The lens microcomputer 111 having transmitted the data frame of the first frame DL1 of the lens data signal DLC rechecks the request-to-send signal RTS. If the request-to-send signal RTS is asserted, the lens microcomputer 111 transmits, after the first frame DL1 whose transmission has been completed, a second frame DL2 of the lens data signal DLC to the camera microcomputer 205. In this way, while the assertion of the request-to-send signal RTS is maintained by the camera microcomputer 205, the lens microcomputer 111 continuously transmits the n frames DL1 to DLn of the lens data signal DLC to the camera microcomputer 205. Then, if the transmission of the n frames set beforehand is completed, the transmission of the lens data signal DLC is stopped.

The camera microcomputer 205 transmits, in response to detecting the start bits ST of the frames of the lens data signal DLC from the lens microcomputer 111, n frames DC1 to DCn of the camera data signal DCL through the second data communication channel.

FIG. 5C illustrates signal waveforms in a case where, during the continuous data communication illustrated in FIG. 5B, the camera microcomputer 205 or the lens microcomputer 111 instructs a suspension of the communication. Also in this case, in response to the assertion of the request-to-send signal RTS by the camera microcomputer 205, the lens microcomputer 111 starts transmitting the lens data signal DLC. Then, in response to detecting the start bit ST of the lens data signal DLC, the camera microcomputer 205 starts transmitting the camera data signal DCL.

In FIG. 5C, T2$w$1 represents a communication suspension time period where the suspension of the communication is instructed by the camera microcomputer 205. In response to generation of a communication suspension event, the camera microcomputer 205 instructs the lens microcomputer 111 to suspend the communication (that is, provides a communication suspension instruction to the lens microcomputer 111) by temporarily negating the request-to-send signal RTS.

In response to detecting the negation of the request-to-send signal RTS, the lens microcomputer 111 suspends transmitting the lens data signal DLC after completing transmitting a frame incompletely transmitted at the time of detecting the negation (this last transmitted frame is illustrated as DL6 in FIG. 5C and hereinafter referred to as "a suspension frame"). In response to the transmission suspension of the camera data signal DLC, the camera microcomputer 205 also suspends transmitting the camera data signal DCL after completing transmitting a frame (illustrated as DC6 in FIG. 5C) thereof corresponding to the suspension frame of the lens data signal DLC.

Such communication control enables, even when the communication suspension instruction is provided during the continuous data communication, managing so as to make a transmitted frame number of the lens data signal DLC equal to that of the camera data signal DCL, that is, so as to synchronize the transmissions of the lens and camera data signals DLC and DCL.

In response to termination of the communication suspension event, the camera microcomputer 205 is allowed to assert the request-to-send signal RTS again to instruct the lens microcomputer 111 to restart the communication (that is, provides a communication restart instruction to the lens microcomputer 111). The lens microcomputer 111 restarts, in response to the communication restart instruction, transmitting the lens data signal DLC from a frame subsequent to the suspension frame (this subsequent frame is illustrated as DL7 in FIG. 12C and hereinafter referred to as "a restart frame"). Then, in response to detecting the start bit ST of the restart frame, the camera microcomputer 205 restarts transmitting the camera data signal DCL from a frame DC7 thereof corresponding to the restart frame of the lens data signal DLC.

After the end of the communication suspension time period T2$w$1, the lens and camera microcomputers 111 and 205 do not instruct a suspension of the communication and perform continuous data transmission in order from the above-described restart frames DL7, DC7 to subsequent frames DL8, DC8 and DL9 and DC9.

Then, in response to occurrence of a communication suspension request event when the transmission of the frame DL9 (and receipt of the frame DC9 in the camera microcomputer 205), the lens microcomputer 111 notifies the camera microcomputer 205 of a suspension of the communication. The notification is performed by not transmitting the lens data signal DLC from the lens microcomputer 111 to the camera microcomputer 205 even though the request-to-send signal RTS is asserted. In FIG. 5C, T2$w$2 represents a communication suspension time period where the suspension of the communication is instructed by the lens microcomputer 111.

The camera microcomputer 205 always monitors the start bit ST of each frame of the lens data signal DLC and is programmed to stop, in response to not detecting the start bit ST of a certain frame of the lens data signal DLC, transmitting a subsequent frame of the camera data signal DCL. Therefore, the camera microcomputer 205 stops, when not receiving the lens data signal DLC (DL10 in FIG. 5C) from the lens microcomputer 111 even though asserting the request-to-send signal RTS, transmitting the camera data signal DCL (DC10 in FIG. 5C) to the lens microcomputer 111, thereby stopping the communication. The camera microcomputer 205 maintains the assertion of the request-to-send signal RTS during the communication suspension time period T2$w$2 instructed by the lens microcomputer 111.

Thereafter, in response to termination of the communication suspension request event in the lens microcomputer 111, the lens microcomputer 111 restarts transmitting the restart frame DL10 of the lens data signal DLC. The camera microcomputer 205 restarts, in response to detecting the start bit ST of the restart frame DL10, transmitting the corresponding frame DC10 of the camera data signal DCL.

Next, with reference to FIGS. 6A and 6B, description will be made of a problem that may occur when, in the communication mode M3, a bit rate of the camera data signal DCL output from the camera microcomputer 205 and that of the lens data signal DLC output from the lens microcomputer 111 are different from each other.

Figure 6A:
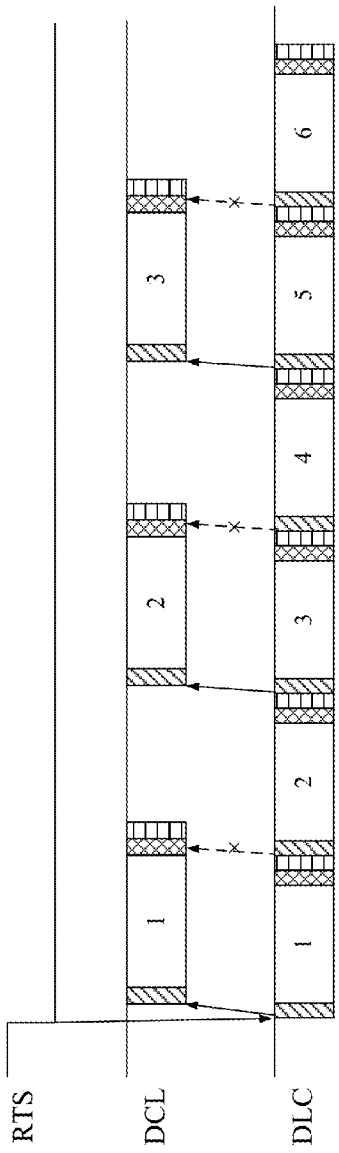
FIGS. 6A and 6B illustrate a problem relating to frames of lens and camera data signals in the communication mode M3 in Embodiment 1.

FIG. 6A illustrates a case where the camera and lens data signals DCL and DLC have the same bit length of one frame (data frame) and the bit rate of the camera data signal DCL is slower than that of the lens data signal DLC. Arrows in FIG. 6A illustrates which start bit ST of the lens data signal DLC is detected by the camera microcomputer 205 and which frame of the camera data signal DCL is transmitted from the camera microcomputer 205 to the lens microcomputer 111. In this case, the camera microcomputer 205 first asserts the request-to-send signal RTS. The lens microcomputer 111 performs, in response to detecting a transmission request by the assertion of the request-to-send signal RTS, the process for producing the lens data signal DLC. The lens microcomputer 111 then starts, upon completion of the preparation for transmitting the lens data signal DLC, transmitting a first frame of the lens data signal DLC to the camera microcomputer 205 through the first data communication channel.

The camera microcomputer 205 starts, in response to detecting the start bit ST of a first frame of the lens data signal DLC received from the lens microcomputer 111, transmitting the camera data signal DCL to the lens microcomputer 111 through the second data communication channel. The transmission and receipt of the first frames of the lens and camera data signals DLC and DCL are performed with no problem. However, the problem occurs in subsequent frames.

Since the assertion of the request-to-send signal RTS is maintained by the camera microcomputer 205, the lens microcomputer 111 starts transmitting a second frame of the lens data signal DLC. However, the start bit ST of the second frame of the lens data signal DLC is output during the transmission of the camera data signal DCL from the camera microcomputer 205, and during that transmission a subsequent bit of the lens data signal DLC is further output. Therefore, the camera microcomputer 205 cannot detect, at a time at which the transmission of the first frame of the camera data signal DCL is completed, the start bit ST of the second frame of the lens data signal DLC though that start bit ST is a signal for permitting starting the transmission of the second frame of the camera data signal DCL. As a result, the camera microcomputer 205 cannot transmit the second frame of the camera data signal DCL corresponding to the second frame of the lens data signal DLC.

Thereafter, when the lens microcomputer 111 starts transmitting a third frame of the lens data signal DLC, the camera microcomputer 205 can output the second frame of the camera data signal DCL in response to detecting the start bit ST of the third frame of the lens data signal DLC.

In a case where such a situation continues, even though the lens microcomputer 111 completes the transmission of the whole frames of the lens data signal DLC, the camera microcomputer 205 only completes the transmission of half of the whole frames of the camera data signal DCL. The camera microcomputer 205 does not detect thereafter the start bit ST of the lens data signal DLC, so that the camera microcomputer 205 cannot transmit the remaining frames of the camera data signal DCL. This makes it difficult to manage the transmitted frame numbers (communication data amounts) between the camera and lens microcomputers 205 and 111 and causes failed data communication. Furthermore, depending on a data content of the lens data signal DLC, the camera microcomputer 205 may erroneously recognize another bit of the lens data signal DLC than the start bit ST as the start bit ST, which may cause a bit shift.

Figure 6B:
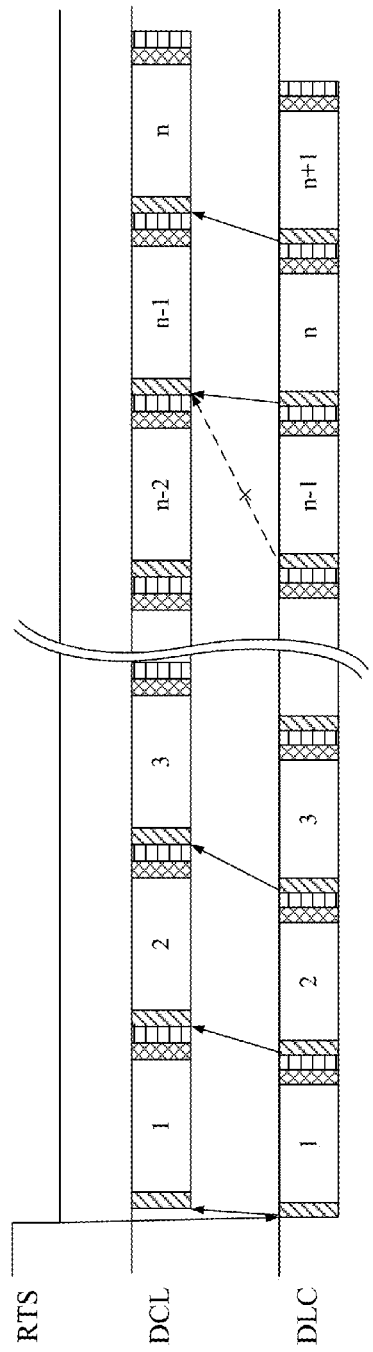

To solve this problem, in this embodiment, as illustrated in FIG. 6B, the camera microcomputer 205 performs detection of the start bit ST of the lens data signal DLC even during transmitting the camera data signal DCL, that is, regardless of whether or not during transmitting the camera data signal DCL, to the lens microcomputer 111. The camera microcomputer 205 determines, at each time at which transmission of one frame of the camera data signal DCL is completed, whether having detected the start bit ST of the lens data signal DLC or not. The camera microcomputer 205 having detected the start bit ST starts a subsequent frame of the camera data signal DCL. This process enables avoiding the problem that, as illustrated in FIG. 6A, a blank time period in which no communication is performed between each two continuous frames and the erroneous recognition of the start bit ST causes the bit shift.

However, a large data amount to be transmitted may cause a frame shift of one frame or more between the camera and lens data signals DCL and DLC. In this case, the camera microcomputer 205 may receive, before transmitting a (n−1)-th frame of the camera data signal DCL corresponding to the start bit ST of a (n−1)-th frame of the lens data signal DLC to the lens microcomputer 111, the stop bit SP of an n-th frame of the lens data signal DLC from the lens microcomputer 111. As a result, the lens data signal DLC to be transmitted to the camera microcomputer 205 and the camera data signal DCL to be transmitted to the lens microcomputer 111 are shifted relative to each other. The relative shift causes a difference in data amount (frame number) between the finally transmitted lens and camera data signals DLC and DCL.

Figure 7:
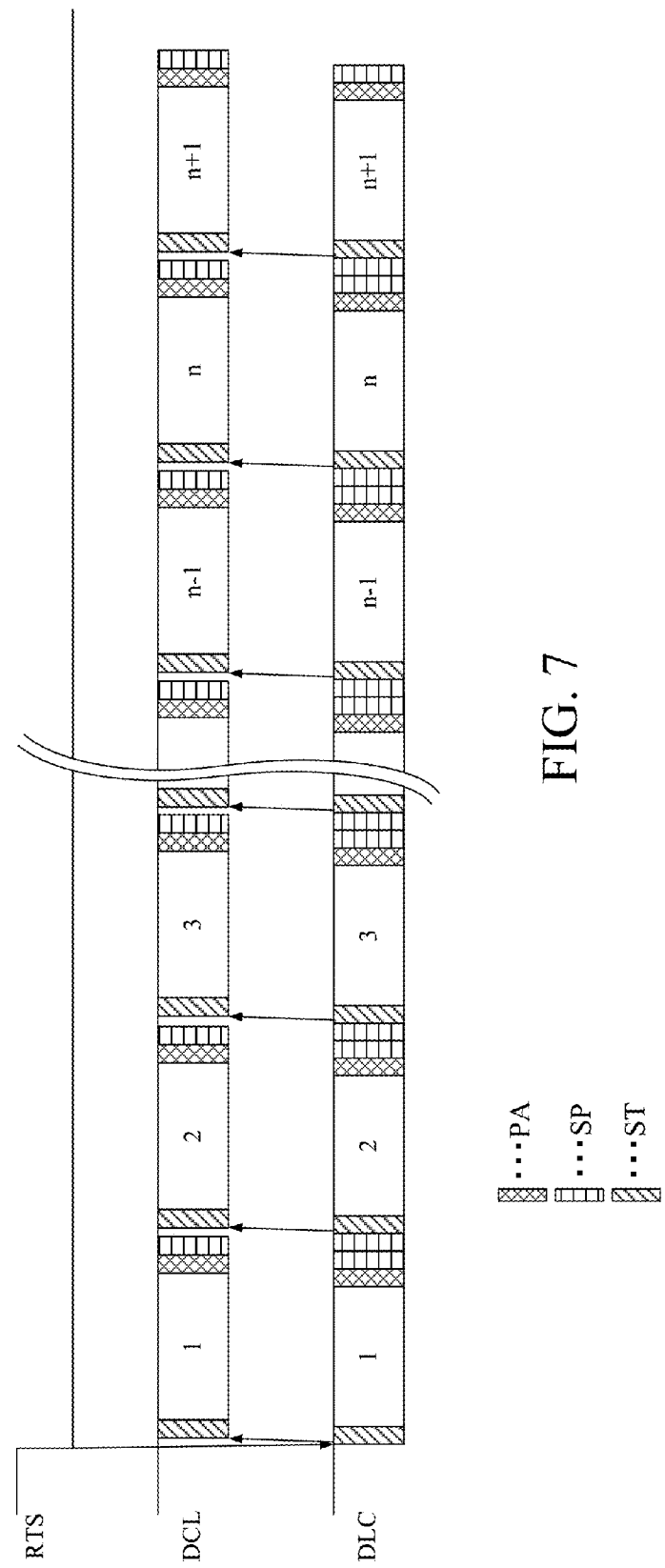
FIG. 7 illustrates the frames of the lens and camera data signals in the communication mode M3 in Embodiment 1.

Thus, this embodiment provides, as illustrated in FIG. 7, a larger number of the stop bits SP in each frame of the lens data signal DLC than that in each frame of the camera data signal DCL. Specifically, each frame of the camera data signal DCL includes one stop bit SP, and on the other hand, each frame of the lens data signal DLC includes two stop bits SP. The data formats of the lens and camera data signals DLC and DCL are mutually the same except for the stop bit number. The difference in stop bit number makes the bit number of one frame (data frame) of the lens data signal DLC larger than that of one frame of the camera data signal DCL. In other words, the difference in stop bit number makes the bit length of one frame of the lens data signal DLC longer than that of one frame of the camera data signal DCL. This setting enables, even when the bit rate of the camera data signal DCL is slower than that of the lens data signal DLC, preventing the frame shifts of the frames of the camera data signal DCL relative to the frames of the lens data signal DLC from being accumulated.

When the bit rates of the lens and camera data signals DLC and DCL are equal to each other, the longer bit length of one frame of the lens data signal DLC than that of one frame of the camera data signal DCL causes the transmission of the camera data signal DCL to be completed earlier than that of the lens data signal DLC. Furthermore, even when the bit rate of the camera data signal DCL is slower than that of the lens data signal DLC due to a bit rate error, one bit as a bit length difference of one frame is a sufficient margin amount for absorbing a transmission time difference between corresponding frames of the camera and lens data signals DCL and DLC due to the bit rate error.

On the other hand, when the bit rate of the camera data signal DCL is faster than that of the lens data signal DLC, the above-described frame shift problem does not occur.

This is because the setting is made that each frame of the camera data signal DCL is transmitted in response to detecting the start bit ST in each frame of the lens data signal DLC. Furthermore, even when the bit rates settable in the camera body 200 and the interchangeable lens 100 are slightly different from each other, increasing the bit number of the stop bits SP in each frame of the lens data signal DLC enables responding to the difference.

As described above, this embodiment enables the camera microcomputer 205 to be capable of detecting the start bit ST of the lens data signal DLC even during transmitting the camera data signal DCL. Furthermore, this embodiment sets the bit length (data length) of each frame of the lens data signal DLC longer than that of each frame of the camera data signal DCL. These features of this embodiment enables avoiding the problem due to the frame shift between the lens and camera data signals DLC and DCL and thereby enables a high-speed large volume data communication between the lens and camera microcomputers 111 and 205 with the three channels.

Embodiment 2

Next, description will be made of a second embodiment (Embodiment 2) of the present invention. A camera system (a camera body 200 and an interchangeable lens 100) in this embodiment has the same configuration and the same communication modes M1 and M2 as those described in Embodiment 1.

Embodiment 1 described, with reference to FIGS. 6A and 6B, the problem occurring in the communication mode M3 due to the difference in bit rate between the camera data signal DCL output from the camera microcomputer 205 and the lens data signal DLC output from the lens microcomputer 111. To avoid this problem, Embodiment 1 provides as illustrated on FIG. 7 a longer bit length (larger number of the start bits ST) to each frame of the lens data signal DLC than that of each frame of the camera data signal DCL.

Figure 8:
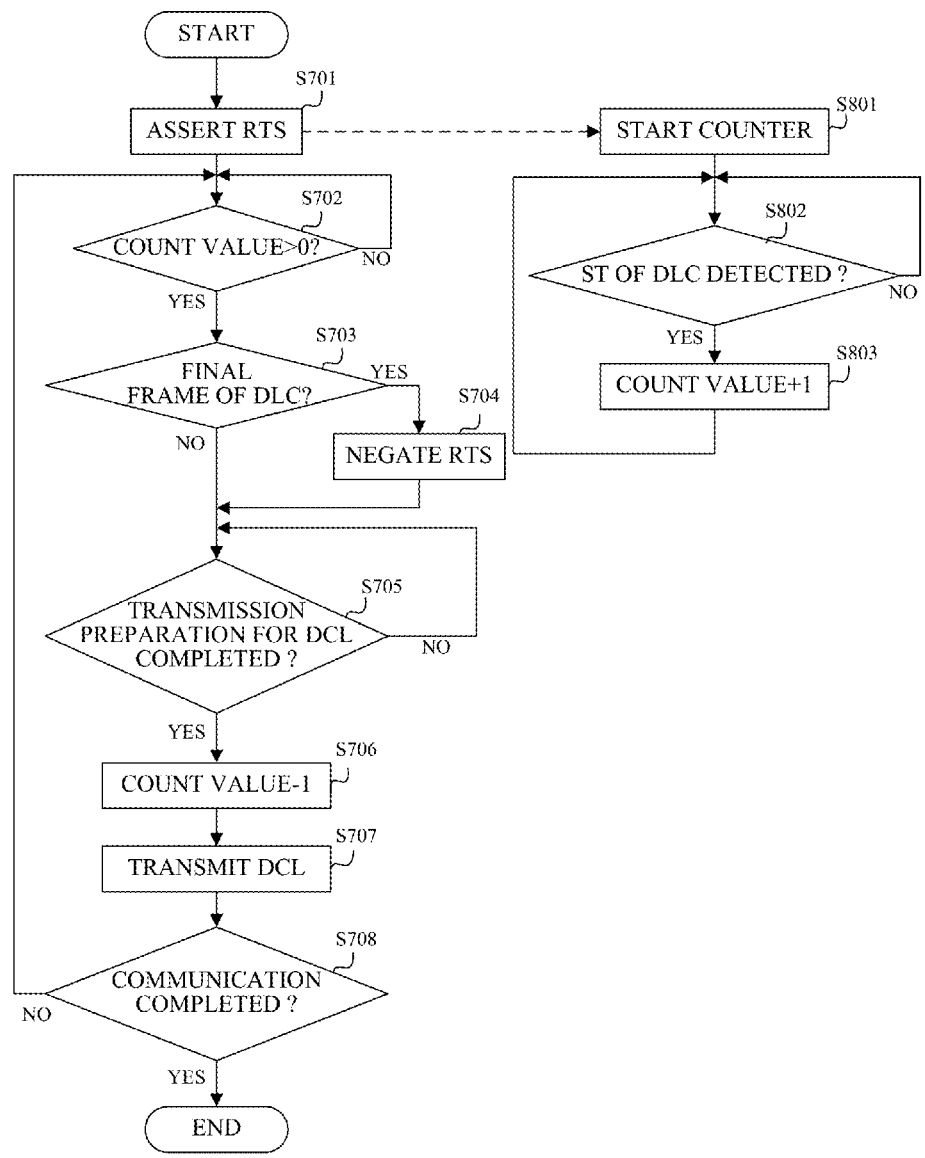
FIG. 8 is a flowchart illustrating a communication process in the communication mode M3 in Embodiment 2.
Figure 9:
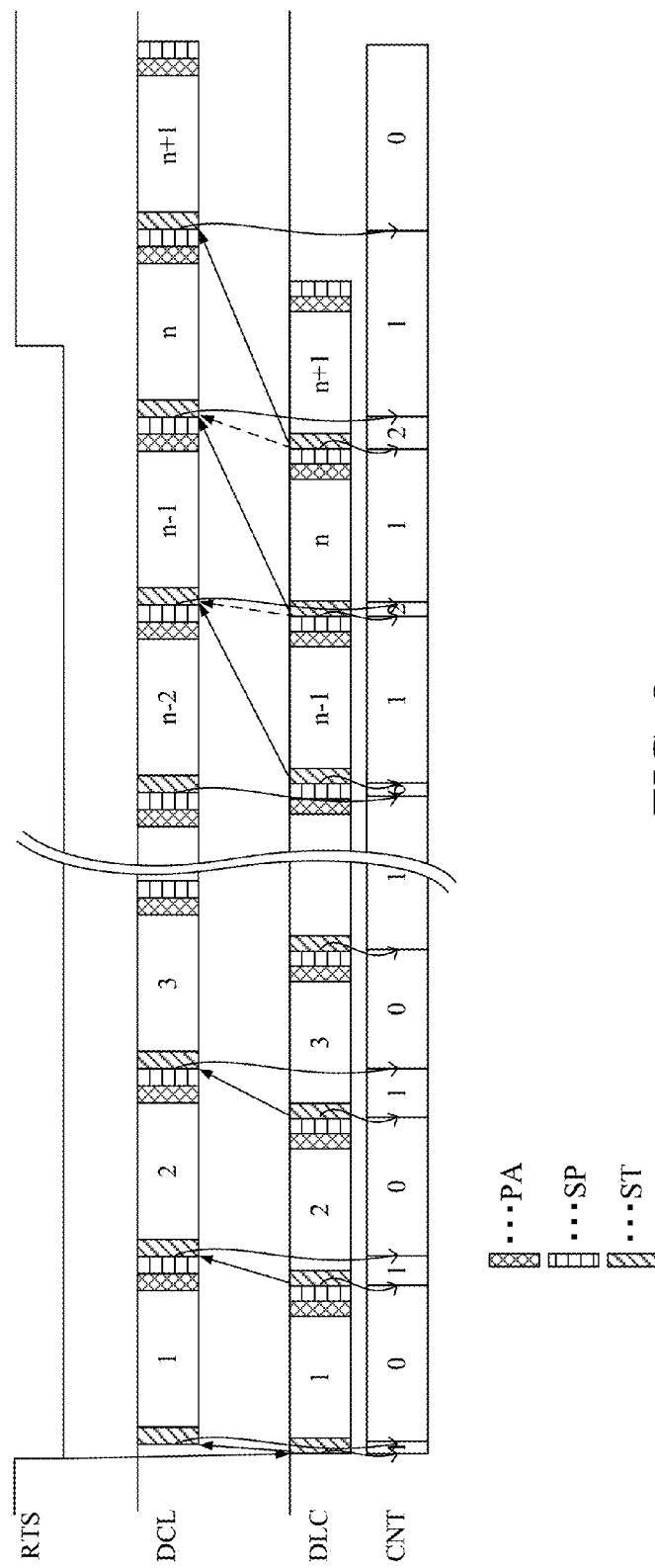
FIG. 9 illustrates frames of lens and camera data signals in the communication mode M3 in Embodiment 2 of the present invention.

In contrast thereto, a second embodiment (Embodiment 2) of the present invention provides a counter to the camera microcomputer 205 to cause the camera microcomputer 205 to recognize a number of times of detecting the start bit ST and thereby avoids the above-describe problem. The camera microcomputer 205 executes, according to a communication control program as a computer program, a communication control process illustrated by a flowchart in FIG. 8 and by a frame relation in FIG. 9. In FIG. 8 and the following description, "S" represents a step. In FIG. 9, "CNT" represents a count value of the counter provided in the camera microcomputer 205.

First, the camera microcomputer 205 at S701 asserts the request-to-send signal RTS and, in response thereto, at S801 starts counting of the counter. In response to detecting the assertion of the request-to-send signal RTS, the lens microcomputer 111 produces the lens data signal DLC. Then, after a preparation for transmitting the lens data signal DLC is completed, the lens microcomputer 111 starts transmitting one frame of the lens data signal DLC through the first data communication channel. In response to detecting the start bit ST of the one frame of the lens data signal DLC transmitted from the lens microcomputer 111 at S802, the camera microcomputer 205 at S803 increments the count value by one.

Furthermore, the camera microcomputer 205 at S702 determines whether or not the count value of the counter is larger than 0 (that is, whether the count value is one of 1 and 2 or 0). If the count value is larger than 0, the camera microcomputer 205 at S703 determines whether or not the received frame of the lens data signal DLC is a (n+1)-th frame as a final frame thereof. If the received frame of the lens data signal DLC is not the final frame, the camera microcomputer 205 at S705 determines whether or not a transmission preparation for a subsequent frame of the camera data signal DCL to be transmitted has been completed. If the received frame of the lens data signal DLC is the final frame, the camera microcomputer 205 at S704 negates the request-to-send signal RTS.

If the transmission preparation has been completed at S705, the camera microcomputer 205 at S706 decrements the count value of the counter by one and at S707 transmits the frame of the camera data signal DCL whose transmission preparation has been completed to the lens microcomputer 111 through the second data communication channel.

Then, the camera microcomputer 205 at S708 determines whether or not the communication with the lens microcomputer 111 has been completed. If the communication has been completed, the camera microcomputer 205 ends this process. If the communication with the lens microcomputer 111 has not been yet completed, the camera microcomputer 205 returns to S702 to repeat processes at S702 to S707.

That is, as long as the count value is 1 or 2 at S702, the camera microcomputer 205 transmits the frame(s) of the camera data signal DCL to the lens microcomputer 111.

FIG. 9 illustrates as an example a case where the camera microcomputer 205 detects, before transmitting a (n−1)-th frame of the camera data signal DCL corresponding to a (n−1)-th frame of the lens data signal DLC to the lens microcomputer 111, the start bit ST of an n-th frame of the lens data signal DLC. In this case, when the start bit ST of the (n−1)-th frame of the lens data signal DLC has been detected and thereby the count value of the counter is 1, the detection of the start bit ST of the n-th frame of the lens data signal DLC increases the count value to 2.

Then, the transmission of the (n−1)-th frame of the camera data signal DCL to the lens microcomputer 111 decreases the count value to 1.

In this case, the transmission of the camera data signal DCL is delayed relative to the receipt of the lens data signal DLC by one frame. However, the camera microcomputer 205 can recognize the delay by checking the count value of the counter not being 0 (that is, the count value being 1). Therefore, the camera microcomputer 205 can transmit, even though not detecting the start bit ST of the lens data signal DLC, the remaining frame(s) of the camera data signal DCL to the lens microcomputer 111.

In this embodiment, the start bit ST of the lens data signal DLC is a signal whose time width is fixed (for example, one bit width). The camera microcomputer 205 is configured so as not to doubly detect and count the same start bit ST.

This embodiment also enables, as Embodiment 1, the camera microcomputer 205 to be capable of detecting the start bit ST of the lens data signal DLC even during transmitting the camera data signal DCL. Furthermore, this embodiment also sets the bit length (data length) of each frame of the lens data signal DLC longer than that of each frame of the camera data signal DCL. Moreover, the camera microcomputer 205 including the counter can recognize the number of times of detecting the start bit ST of the lens data signal DLC. These features of this embodiment enables further securely avoiding the problem due to the frame shift between the lens and camera data signals DLC and DCL and thereby enables a high-speed large volume data communication between the lens and camera microcomputers 111 and 205 with the three channels.

As described above, each of the embodiments enables a high-speed large volume data communication between the lens and camera microcomputers 111 and 205 with the three channels, without adding a new channel.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-070230, filed on Mar. 31, 2016, which is hereby incorporated by reference herein in its entirety.

What is claimed is:

1. An image-capturing apparatus to which an accessory apparatus is detachably attachable, the image-capturing apparatus comprising:
a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and
a camera controller configured to control data communication with the accessory apparatus through the camera communicator,
wherein the camera controller is configured to:
in response to detecting a start bit included in each of frames of the accessory data and indicating a start of each frame, transmit one frame of the camera data to the accessory apparatus through the second data communication channel; and
perform detection of the start bit regardless of whether or not during transmitting the camera data to the accessory apparatus.

2. An image-capturing apparatus according to claim 1, wherein:
the camera controller includes a counter; and
the camera controller is configured to:
increment a count value of the counter in response to each detection of the start bit and decrease the count value in response to each transmission of one frame of the camera data; and
transmit the camera data until the count value becomes 0.

3. An image-capturing apparatus according to claim 1, wherein:
the camera controller is configured so as to be capable of selectively performing asynchronous serial communication and clock-synchronous serial communication; and
the camera controller is configured to:
provide the notice to the accessory apparatus by switching a signal level on the notification channel from a first level to a second level; and
in the clock-synchronous serial communication, output a clock signal to the accessory apparatus through the notification channel.

4. An image-capturing system comprising:
an image-capturing apparatus; and
an accessory apparatus detachably attachable to the image capturing apparatus,
the image capturing apparatus and the accessory apparatus respectively comprising:
a camera communicator and an accessory communicator configured to provide three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and
a camera controller and an accessory controller configured to control data communication therebetween,
wherein:
the accessory controller is configured to:
transmit, during receiving a transmission request as the notice from the image-capturing apparatus through the notification channel, the accessory data in frame units to the image-capturing apparatus through the first data communication channel; and
transmit the accessory data including a start bit indicating a start of each of frames of the accessory data, and
the camera controller is configured to:
in response to detecting the start bit included in each frame of the accessory data, transmit one frame of the camera data to the accessory controller through the second communication channel; and
perform detection of the start bit regardless of whether or not during transmitting the camera data to the accessory apparatus.

5. An accessory apparatus detachably attachable to an image-capturing apparatus, the accessory apparatus comprising:
an accessory communicator configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and an accessory controller configured to control data communication with the image-capturing apparatus through the accessory communicator, wherein the accessory controller is configured to transmit, to the image-capturing apparatus, the accessory data whose data length of one frame is longer than that of one frame of the camera data.

6. An accessory apparatus according to claim 5, wherein:

the accessory data and the camera data each include a stop bit included in each of frames thereof and indicating an end of each frame; and the accessory controller is configured to set a number of stop bits included in one frame of the accessory data larger than that included in one frame of the accessory data.

7. An accessory apparatus according to claim 5, wherein:

the accessory controller is configured so as to be capable of selectively performing asynchronous serial communication and clock-synchronous serial communication; and the accessory controller is configured to:

receive the notice from the image-capturing apparatus by switching of a signal level on the notification channel from a first level to a second level; and in the clock-synchronous serial communication, receive a clock signal from the image-capturing apparatus through the notification channel.

8. An image-capturing apparatus to which an accessory apparatus is detachably attachable, the image-capturing apparatus comprising:

a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and a camera controller configured to control data communication with the accessory apparatus through the camera communicator, wherein the camera controller is configured to receive, from the accessory apparatus, the accessory data whose data length of one frame is longer than that of one frame of the camera data.

9. A non-transitory storage medium storing a control program as a computer program for causing a computer to control an image-capturing apparatus to which an accessory apparatus is detachably attachable, the image-capturing apparatus providing, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, wherein the control program is configured to cause the computer to perform:

a process for performing, regardless of whether or not during transmitting the camera data to the accessory apparatus through the second data communication channel, detection of a start bit included in each of frames of the accessory data and indicating a start of each frame, and a process for transmitting, in response to each detection of the start bit, one frame of the camera data to the accessory apparatus.

10. A non-transitory storage medium storing a control program as a computer program for causing a computer to control an accessory apparatus detachably attachable to an image-capturing apparatus, the accessory apparatus providing, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, wherein the control program is configured to cause the computer to transmit, to the image-capturing apparatus, the accessory data whose data length of one frame is longer than that of one frame of the camera data.

* * * * *